United States Patent
Wang et al.

(10) Patent No.: US 10,607,388 B2
(45) Date of Patent: Mar. 31, 2020

(54) DISPLAY CONTROL METHOD, DISPLAY CONTROL DEVICE, STORAGE MEDIUM AND TERMINAL OF AUTOSTEREOSCOPIC THREE-DIMENSIONAL (3D) IMAGE

(71) Applicant: Shenzhen China Star Optoelectronics Semiconductor Display Technology Co., Ltd., Shenzhen (CN)

(72) Inventors: Limin Wang, Shenzhen (CN); Tai-jiun Hwang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 22 days.

(21) Appl. No.: 15/776,084

(22) PCT Filed: Mar. 12, 2018

(86) PCT No.: PCT/CN2018/078695
§ 371 (c)(1),
(2) Date: May 15, 2018

(87) PCT Pub. No.: WO2019/153411
PCT Pub. Date: Aug. 15, 2019

(65) Prior Publication Data
US 2019/0244411 A1    Aug. 8, 2019

(30) Foreign Application Priority Data
Feb. 7, 2018    (CN) .......................... 2018 1 0121373

(51) Int. Cl.
*G06T 15/00*    (2011.01)
*H04N 13/371*    (2018.01)
(Continued)

(52) U.S. Cl.
CPC .......... *G06T 15/00* (2013.01); *H04N 13/128* (2018.05); *H04N 13/156* (2018.05);
(Continued)

(58) Field of Classification Search
CPC ....... G06T 15/00; H04N 13/32; H04N 13/371
See application file for complete search history.

(56) References Cited

U.S. PATENT DOCUMENTS

2011/0169825 A1    7/2011    Ishiyama et al.
2011/0292045 A1    12/2011   Nakamura et al.
(Continued)

FOREIGN PATENT DOCUMENTS

CN    102172031 A    8/2011
CN    102308590 A    1/2012
(Continued)

*Primary Examiner* — Sarah Lhymn
(74) *Attorney, Agent, or Firm* — Mark M. Friedman (57) ABSTRACT

Provided are a display control method, a display control device, a storage medium and a terminal of autostereoscopic three-dimensional (3D) image. The method includes the following steps: capturing distance information of a background object relative to a screen; capturing depth information of display content of the screen; determining a relative positional relation between the background object and the depth based on the distance information and the depth information; and causing the depth to move toward a side of the front of the screen when the background object is located on a side of the depth facing a front of the screen, thereby causing the background object to be located on a side of the depth facing a back of the screen.

12 Claims, 3 Drawing Sheets

(51) Int. Cl.
*H04N 13/32* (2018.01)
*H04N 13/128* (2018.01)
*H04N 13/156* (2018.01)
*H04N 13/302* (2018.01)

(52) U.S. Cl.
CPC ........... *H04N 13/302* (2018.05); *H04N 13/32* (2018.05); *H04N 13/371* (2018.05)

(56) References Cited

U.S. PATENT DOCUMENTS

| | | | |
|---|---|---|---|
| 2012/0229462 A1* | 9/2012 | Eichenlaub | G02B 27/2214 345/419 |
| 2013/0009956 A1 | 1/2013 | Takahashi et al. | |
| 2013/0194253 A1 | 8/2013 | Ohmi | |
| 2013/0301907 A1 | 11/2013 | Shim et al. | |
| 2014/0036046 A1* | 2/2014 | Hasegawa | H04N 13/128 348/54 |
| 2017/0127050 A1* | 5/2017 | Mather | G02B 3/0037 |

FOREIGN PATENT DOCUMENTS

| | | | |
|---|---|---|---|
| CN | 102655596 A | | 9/2012 |
| CN | 102866504 A | | 1/2013 |
| CN | 104272731 A | | 1/2015 |
| CN | 104702935 A | | 6/2015 |
| CN | 105005176 A | * | 10/2015 |
| TW | 201327470 A | | 7/2013 |
| WO | 2014103088 A1 | | 7/2014 |

\* cited by examiner

DISPLAY CONTROL METHOD, DISPLAY CONTROL DEVICE, STORAGE MEDIUM AND TERMINAL OF AUTOSTEREOSCOPIC THREE-DIMENSIONAL (3D) IMAGE

FIELD OF INVENTION

This present invention relates to liquid crystal display technology, and especially to a display control method, display control device, storage medium, and terminal of an autostereoscopic three-dimensional (3D) image.

BACKGROUND OF INVENTION

Autostereoscopic three-dimensional (3D) display technology induces a new dimension based on plan display technology to form 3D display close to real word sense and has become a popular new display technology. According to different technical principles for realizing the autostereoscopic 3D effect, present mainstream autostereoscopic 3D display technology can be divided into optical barrier technology, lenticular lenses technology, and directional backlight technology, etc. In addition, because transparent display screens have a special characteristic, they also have been a widespread concern.

Known autostereoscopic 3D display technology performs display using a parallax image display method. This gives a viewer to feel depth of fixed 3D image and it is not affected by environment. But, when used in an autostereoscopic 3D transparent display, the viewer will see a background image and display content at the same time. Therefore, the depth displayed by the display content may be in conflict with the depth seen by the transmitted background image.

Therefore, there is a need to provide a display control method, display control device, storage medium and terminal of autostereoscopic three-dimensional (3D) image, so as to overcome above disadvantages in the prior art.

SUMMARY OF INVENTION

The present invention substantially object is to provide a display control method, a display control device, a storage medium, and a terminal of autostereoscopic three-dimensional (3D) image to improve display quality.

To solve the above-mentioned technology problem, the present invention provides a display control method of an autostereoscopic three-dimensional (3D) image, comprising:

capturing distance information of a background object relative to a screen in real time;

capturing depth information of display content of the screen, the depth information having a position and length for defining the depth;

determining a relative positional relation between the background object and the depth based on the distance information and the depth information; and causing the depth to move toward a side of the front of the screen when the background object is located on a side of the depth facing a front of the screen, thereby causing the background object to be located on a side of the depth facing a back of the screen.

In an embodiment of the above method according to the present invention, wherein the display content further comprises a left parallax image and a right parallax image;

wherein the step of causing the depth to move toward a side of the front of the screen when the background object is located on a side of the depth facing a front of the screen, thereby causing the background object to be located on a side of the depth facing a back of the screen further comprises:

adjusting a display position of the left parallax image and/or the right parallax image on the screen, thereby causing the depth to move toward the side of the front of the screen, and further causing the background object to be located on the side of the depth facing the back of the screen.

In accordance with one embodiment, the invention is directed towards a display control method of an autostereoscopic three-dimensional (3D) image, wherein the left parallax image has a plurality of left parallax pixels, and the plurality of left parallax pixels are arranged in a rectangular array of N columns, wherein the right parallax image has a plurality of right parallax pixels, and the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other;

wherein the step of adjusting a display position of the left parallax image and/or the right parallax image on the screen, thereby causing the depth to move toward the side of the front of the screen, and further causing the background object to be located on the side of the depth facing the back of the screen further comprises:

reducing a distance between the left parallax pixel and the right parallax pixel with the same column number, thereby causing the depth to move toward the side of the front of the screen, and further causing the background object to be located on the side of the depth facing the back of the screen.

In accordance with one embodiment, the invention is directed towards a display control method of an autostereoscopic three-dimensional (3D) image, wherein the step of reducing a distance between the left parallax pixel and the right parallax pixel with the same column number, thereby causing the depth to move toward the side of the front of the screen, and further causing the background object to be located on the side of the depth facing the back of the screen further comprises:

moving each column of the right parallax pixels to a right by a preset distance value in respect to each column of the left parallax pixels, thereby causing the depth to move toward the side of the front of the screen, and further causing the background object to be located on the side of the depth facing the back of the screen.

In accordance with one embodiment, the invention is directed towards a display control method of an autostereoscopic three-dimensional (3D) image, wherein the step of reducing a distance between the left parallax pixel and the right parallax pixel with the same column number, thereby causing the depth to move toward the side of the front of the screen, and further causing the background object to be located on the side of the depth facing the back of the screen further comprises:

moving each column of the left parallax pixels to a left by a preset distance value in respect to each column of the right parallax pixels, thereby causing the depth to move toward the side of the front of the screen, and further causing the background object to be located on the side of the depth facing the back of the screen.

The present invention further provides a display control method of an autostereoscopic three-dimensional (3D) image, comprising:

capturing distance information of a background object relative to a screen;

capturing depth information of display content of the screen, the depth information having a position and length for defining the depth;

determining a relative positional relation between the background object and the depth based on the distance information and the depth information; and causing the depth to move toward a side of the front of the screen when the background object is located on a side of the depth facing a front of the screen, thereby causing the background object to be located on a side of the depth facing a back of the screen.

In accordance with one embodiment, the invention is directed towards a display control method of an autostereoscopic three-dimensional (3D) image, wherein the display content further comprises a left parallax image and a right parallax image;

wherein the step of causing the depth to move toward a side of the front of the screen when the background object is located on a side of the depth facing a front of the screen, thereby causing the background object to be located on a side of the depth facing a back of the screen further comprises:

adjusting a display position of the left parallax image and/or the right parallax image on the screen, thereby causing the depth to move toward the side of the front of the screen, and further causing the background object to be located on the side of the depth facing the back of the screen.

In accordance with one embodiment, the invention is directed towards a display control method of an autostereoscopic three-dimensional (3D) image, wherein the left parallax image has a plurality of left parallax pixels, and the plurality of left parallax pixels are arranged in a rectangular array of N columns, wherein the right parallax image has a plurality of right parallax pixels, and the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other;

wherein the step of adjusting a display position of the left parallax image and/or the right parallax image on the screen, thereby causing the depth to move toward the side of the front of the screen, and further causing the background object to be located on the side of the depth facing the back of the screen further comprises:

reducing a distance between the left parallax pixel and the right parallax pixel with the same column number, thereby causing the depth to move toward the side of the front of the screen, and further causing the background object to be located on the side of the depth facing the back of the screen.

In accordance with one embodiment, the invention is directed towards a display control method of an autostereoscopic three-dimensional (3D) image, wherein the step of reducing a distance between the left parallax pixel and the right parallax pixel with the same column number, thereby causing the depth to move toward the side of the front of the screen, and further causing the background object to be located on the side of the depth facing the back of the screen further comprises:

moving each column of the right parallax pixels to a right by a preset distance value in respect to each column of the left parallax pixels, thereby causing the depth to move toward the side of the front of the screen, and further causing the background object to be located on the side of the depth facing the back of the screen.

In accordance with one embodiment, the invention is directed towards a display control method of an autostereoscopic three-dimensional (3D) image, wherein the step of reducing a distance between the left parallax pixel and the right parallax pixel with the same column number, thereby causing the depth to move toward the side of the front of the screen, and further causing the background object to be located on the side of the depth facing the back of the screen further comprises:

moving each column of the left parallax pixels to a left by a preset distance value in respect to each column of the right parallax pixels, thereby causing the depth to move toward the side of the front of the screen, and further causing the background object to be located on the side of the depth facing the back of the screen.

Another object of the present invention is to provide a display control device of an autostereoscopic three-dimensional (3D) image, comprising:

a first capture module for capturing distance information of a background object relative to a screen;

a second capture module for capturing depth information of display content of the screen, the depth information having a position and length for defining the depth;

a determination module for determining a relative positional relation between the background object and the depth based on the distance information and the depth information; and an adjustment module for causing the depth to move toward a side of the front of the screen when the background object is located on a side of the depth facing a front of the screen, thereby causing the background object to be located on a side of the depth facing a back of the screen.

In accordance with one embodiment, the invention is directed towards a display control device of an autostereoscopic three-dimensional (3D) image, wherein the display content further comprises a left parallax image and a right parallax image;

wherein the adjustment module for adjusting a display position of the left parallax image and/or the right parallax image on the screen, thereby causing the depth to move toward the side of the front of the screen, and further causing the background object to be located on the side of the depth facing the back of the screen.

In accordance with one embodiment, the invention is directed towards a display control device of an autostereoscopic three-dimensional (3D) image, wherein the left parallax image has a plurality of left parallax pixels, and the plurality of left parallax pixels are arranged in a rectangular array of N columns, wherein the right parallax image has a plurality of right parallax pixels, and the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other;

wherein the adjustment module for reducing a distance between the left parallax pixel and the right parallax pixel with the same column number, thereby causing the depth to move toward the side of the front of the screen, and further causing the background object to be located on the side of the depth facing the back of the screen.

Another object of the present invention is to provide a storage medium, particularly for an autostereoscopic three-dimensional (3D) image. That is, at least one computer readable storage medium having a computer readable computer program stored thereon, and when the computer program operating on the computer, thereby causing the computer to perform any one of the above methods.

Another object of the present invention is to provide a terminal, particularly for an autostereoscopic three-dimensional (3D) image. The terminal comprises at least one processor and at least one memory. The memory stores computer program. The at least one memory and the computer program configured to, with the at least one processor, causing the terminal to perform any one of the above methods. That is, the processor executes any one of the above methods by calling the computer program stored in the memory.

The advantages of the present invention are: to distinguish the prior art the present invention accomplishes a 3D display effect by capturing distance information of the background object relative to a screen; capturing depth information of display content of the screen, the depth information having a position and length for defining the depth; determining a relative positional relation between the background object and the depth based on the distance information and the depth information; and causing the depth to move toward a side of the front of the screen when the background object is located on a side of the depth facing a front of the screen, thereby causing the background object to be located on a side of the depth facing a back of the screen. Further avoid the background object located in the side of the front of the depth to improve display quality.

DESCRIPTION OF DRAWINGS

In order to more clearly describe the embodiments of this disclosure or the conventional technical solutions, the description is used to make a simple introduction of the drawings used in the following embodiments. The following description of the drawings are merely some embodiments of this disclosure. In order, more clearly describe the embodiments of this disclosure or the conventional technical solutions, the description is used to make a simple introduction of the drawings used in the following embodiments. The following description of the drawings are merely some embodiments of this disclosure. Those of ordinary skill in the art can also obtain other drawings based on these drawings without creative effort.

DETAILED DESCRIPTION OF PREFERRED EMBODIMENTS

Hereinafter, the present invention will be described in detail in conjunction with the preferred embodiments of the present invention and the accompanying drawings. In the entire specification and drawings, the same or similar components or elements having the same or similar functions will be denoted by the same reference numerals. The embodiments described below with reference to the drawings are exemplary, are used for explaining the present invention only, and should not be construed as limiting the present invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The terms "first," "second," "third," and the like in the description and claims of the present application and in the above drawings are used to distinguish similar objects and not necessarily to describe a particular order or sequence. It should be understood that the objects so described are interchangeable under appropriate circumstances. In addition, the terms "include" and "have" and any variations thereof are intended to cover non-exclusive inclusions. For example, a series of steps in a process, a method, or a series of modules or units of a device, a terminal, and a system are specifically disclosed. Further include steps or modules or units that are not explicitly disclosed, may also include other steps or modules or units for these processes, methods, devices, terminals, or systems.

The following disclosure provides many different embodiments or examples for implementing different structures of the present invention. In order to simplify the disclosure of the present invention, the components and settings of specific examples are described below. Of course, they are merely examples and it is not intended to limit the present invention. In addition, the present invention may repeat reference numerals and/or reference letters in different examples. Such repetitions are for simplification and clear disclosure, and do not limit the relationship between various embodiments and/or settings. Furthermore, examples of various specific processes and materials provided by the present invention. Many modifications and other embodiments of the inventions set forth herein will come to mind to one skilled in the art to which these embodiments of the invention pertain having the benefit of the teachings presented in the following descriptions and the associated drawings. Although specific terms are employed herein, they are used in a generic and descriptive sense only and not for purposes of limitation.

Figure 1:
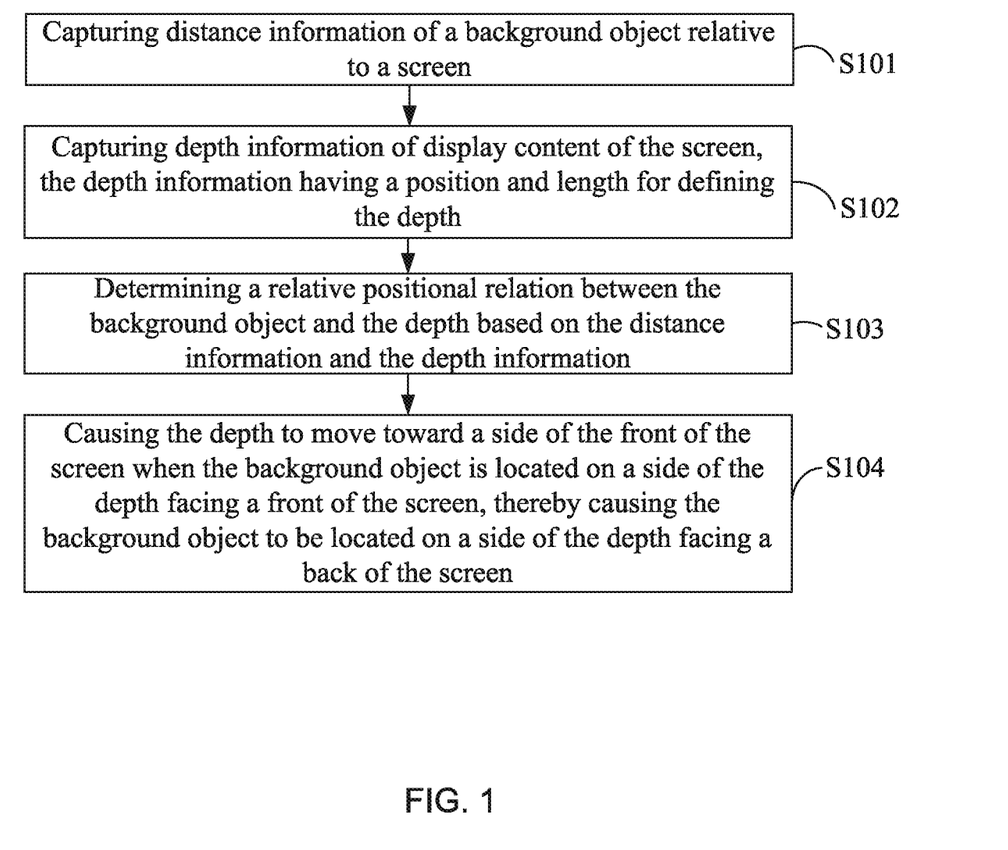
FIG. 1 is a simplified flowchart illustrating a display control method of an autostereoscopic three-dimensional (3D) image according to some preferred embodiments of this present disclosure.

Referring to FIG. 1, a simplified flowchart illustrating a display control method of an autostereoscopic three-dimensional (3D) image according to some preferred embodiments of this present disclosure is shown. As shown in FIG. 1, one embodiment of the present invention provides a display control method mainly used in an autostereoscopic three-dimensional (3D) liquid crystal display screen. The method comprising following steps.

A step S101 of capturing distance information of a background object relative to a screen.

A step S102 of capturing depth information of display content of the screen, the depth information having a position and length for defining the depth.

A step S103 of determining a relative positional relation between the background object and the depth based on the distance information and the depth information.

A step S104 of causing the depth to move toward a side of the front of the screen when the background object is located on a side of the depth facing a front of the screen, thereby causing the background object to be located on a side of the depth facing a back of the screen.

Hereinafter, various steps of the display control method of an autostereoscopic three-dimensional (3D) image above will be described detail in conjunction with the drawings.

In a further preferred embodiment of step S101, detecting the distance information of the background object relative to the screen may be by a detection device provided on the autostereoscopic three-dimensional (3D) liquid crystal display screen, and the detection is performed in real time.

In a further preferred embodiment of step S102, the display content further comprises a left parallax image and a right parallax image, wherein the left parallax image has a plurality of left parallax pixels, and the plurality of left parallax pixels are arranged in a rectangular array of N columns, wherein the right parallax image has a plurality of right parallax pixels, and the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other.

In a further preferred embodiment of step S102, the depth information has a position and length for defining the depth, further, the position of the depth is relative to a position of the screen, and the length of the depth is a length along direction of the screen.

In a further preferred embodiment of step S103, determining a relative positional relation between the background object and the depth based on the distance information and the depth information. It is mainly used to determine whether the background object is located on a side of the depth facing a back of the screen or on a side of the depth facing a front of the screen.

Figure 2:
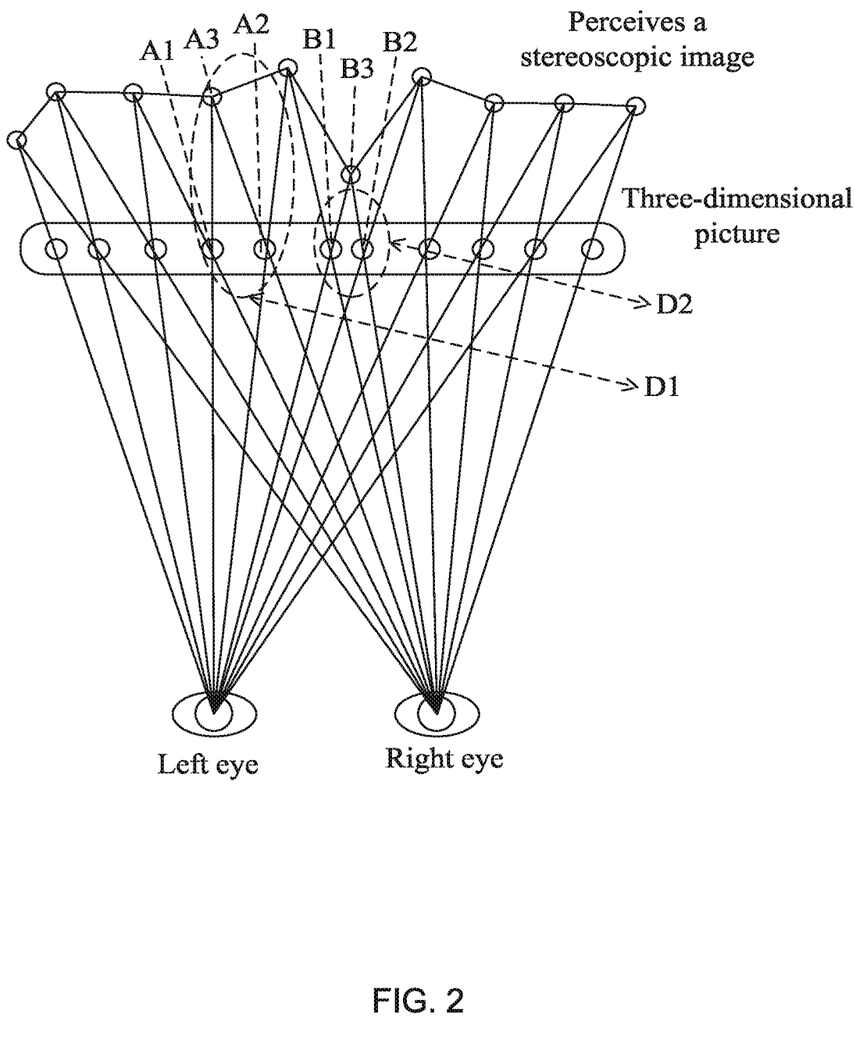
FIG. 2 is a schematic view illustrating a 3D display according to some preferred embodiments of this present disclosure.

In a further preferred embodiment of step S104, as shown in FIG. 2, in a situation where smaller the distance between the above left parallax image and right parallax image based on the same display content, thereby causing closer the human eye to the result of the distance perception of the displayed content, and further causing closer the depth to the observer. Conversely, in a situation where larger the distance between the above left parallax image and right parallax image based on the same display content, thereby causing distant the human eye to the result of the distance perception of the displayed content, and further causing distant the depth of field to the observer. For example, a corresponding set of the left parallax images A1 and the right parallax images A2, the human eye perceives a stereoscopic image is A3, the left parallax image A1 and a right parallax image A2 as D1. Further, a corresponding set of the left parallax images B1 and the right parallax images B2, the human eye perceives a stereoscopic image is B3, the left parallax image B1 and a right parallax image B2 as D2, and D1 less than D2. Therefore, the B3 is closer to a three-dimensional picture of a display than A3, that is, the three-dimensional picture of the display is a screen.

As described above, in a further preferred embodiment of step S104, adjusting a display position of the left parallax image and/or the right parallax image on the screen, thereby causing the depth to move toward the side of the front of the screen, and further causing the background object to be located on the side of the depth facing the back of the screen.

More specifically, in a preferred embodiment of step S104, further, reducing a distance between the left parallax pixel and the right parallax pixel with the same column number, thereby causing the depth to move toward the side of the front of the screen, and further causing the background object to be located on the side of the depth facing the back of the screen. Furthermore, calculating the value of the reduction distance based on the actually detected distance information and depth of field information.

Figure 3:
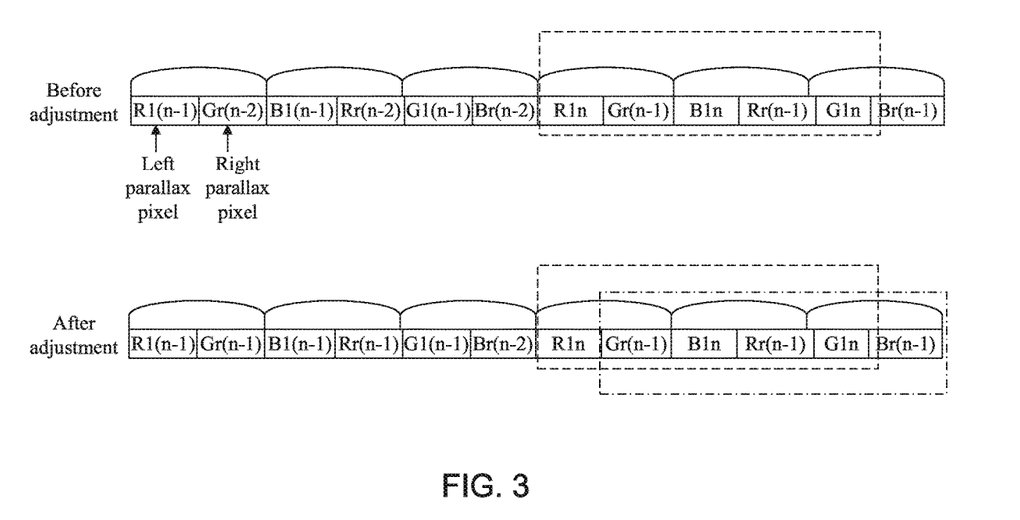
FIG. 3 is a schematic view illustrating arrangement adjustment of a display content having a left parallax image and a right parallax image according to some preferred embodiments of this present disclosure.

In the display control method of an autostereoscopic three-dimensional (3D) image according to some embodiments of the present invention, as shown in FIG. 3, the method further, moving each column of the right parallax pixels to a right by a preset distance value in respect to each column of the left parallax pixels in step S104, thereby causing the depth to move toward the side of the front of the screen, and further causing the background object to be located on the side of the depth facing the back of the screen. The preset distance value is a length of any one of the above pixels.

In the display control method of an autostereoscopic three-dimensional (3D) image according to some embodiments of the present invention, as shown in FIG. 3, the method further, moving each column of the left parallax pixels to a left by a preset distance value in respect to each column of the right parallax pixels in step S104, thereby causing the depth to move toward the side of the front of the screen, and further causing the background object to be located on the side of the depth facing the back of the screen.

The advantages of the display control method of an autostereoscopic three-dimensional (3D) image of the present invention are: by capturing distance information of the background object relative to a screen; capturing depth information of display content of the screen, the depth information having a position and length for defining the depth; determining a relative positional relation between the background object and the depth based on the distance information and the depth information; and causing the depth to move toward a side of the front of the screen when the background object is located on a side of the depth facing a front of the screen, thereby causing the background object to be located on a side of the depth facing a back of the screen. Further avoid the background object located in the side of the front of the depth to improve display quality.

Figure 4:
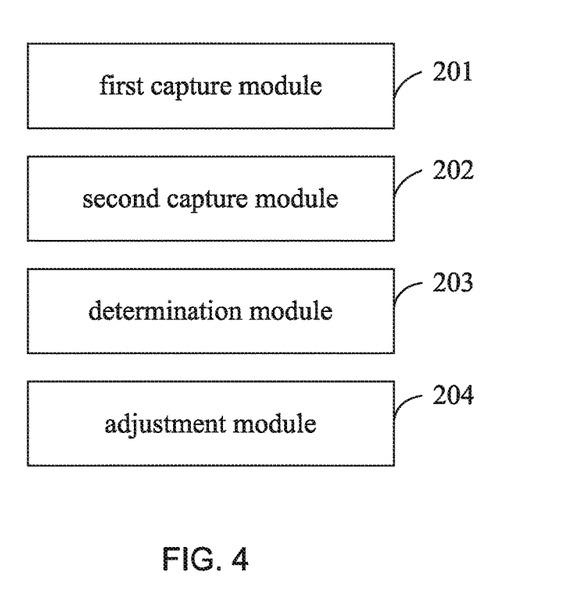
FIG. 4 is a schematic view of a structure illustrating a display control device of an autostereoscopic three-dimensional (3D) image according to some preferred embodiments of this present disclosure.

Referring to FIG. 4, a schematic view of a structure illustrating a display control device of an autostereoscopic three-dimensional (3D) image according to some preferred embodiments of this present disclosure is shown. As shown in FIG. 4, one embodiment of the present invention provides a display control device. The device comprises a first capture module 201, a second capture module 202, a determination module 203, and an adjustment module 204.

In the preferred embodiment of the above structure, further, the first capture module 201 for capturing distance information of a background object relative to a screen. Furthermore, detecting the distance information of the background object relative to the screen may be by a detection device provided on the autostereoscopic three-dimensional (3D) liquid crystal display screen, and the detection is performed in real time.

In the preferred embodiment of the above structure, further, the second capture module 202 for capturing depth information of display content of the screen, the depth information having a position and length for defining the depth. the display content further comprises a left parallax image and a right parallax image, wherein the left parallax image has a plurality of left parallax pixels, and the plurality of left parallax pixels are arranged in a rectangular array of N columns, wherein the right parallax image has a plurality of right parallax pixels, and the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other.

In the preferred embodiment of the above structure, further, the determination module 203 for determining a relative positional relation between the background object and the depth based on the distance information and the depth information. It is mainly used to determine whether the background object is located on a side of the depth facing a back of the screen or on a side of the depth facing a front of the screen.

In the preferred embodiment of the above structure, further, the adjustment module 204 for causing the depth to move toward a side of the front of the screen when the background object is located on a side of the depth facing a front of the screen, thereby causing the background object to be located on a side of the depth facing a back of the screen.

Specifically, in the display control device of an autostereoscopic three-dimensional (3D) image of the present invention with the above structure, the display content further comprises a left parallax image and a right parallax image. Wherein the adjustment module 204 for adjusting a display position of the left parallax image and/or the right parallax image on the screen, thereby causing the depth to move toward the side of the front of the screen, and further causing the background object to be located on the side of the depth facing the back of the screen.

More specifically, in the display control device of an autostereoscopic three-dimensional (3D) image of the present invention with the above structure, further, the left parallax image has a plurality of left parallax pixels, and the plurality of left parallax pixels are arranged in a rectangular array of N columns, wherein the right parallax image has a plurality of right parallax pixels, and the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other. The adjustment module 204 for reducing a distance between the left parallax pixel and the right parallax pixel with the same column number, thereby causing the depth to move toward the side of the front of the screen, and further causing the background object to be located on the side of the depth facing the back of the screen.

In more detail, in the display control device of an autostereoscopic three-dimensional (3D) image according to some embodiments of the present invention with the above structure, as shown in FIG. 3, the adjustment module 204 is configured to moving each column of the right parallax pixels to a right by a preset distance value in respect to each column of the left parallax pixels, thereby causing the depth to move toward the side of the front of the screen, and further causing the background object to be located on the side of the depth facing the back of the screen. The preset distance value is a length of any one of the above pixels.

In more detail, in the display control device of an autostereoscopic three-dimensional (3D) image according to some embodiments of the present invention with the above structure, as shown in FIG. 3, the adjustment module 204 is configured to moving each column of the left parallax pixels to a left by a preset distance value in respect to each column of the right parallax pixels, thereby causing the depth to move toward the side of the front of the screen, and further causing the background object to be located on the side of the depth facing the back of the screen.

The advantages of the display control device of an autostereoscopic three-dimensional (3D) image of the present invention are: by capturing distance information of the background object relative to a screen; capturing depth information of display content of the screen, the depth information having a position and length for defining the depth; determining a relative positional relation between the background object and the depth based on the distance information and the depth information; and causing the depth to move toward a side of the front of the screen when the background object is located on a side of the depth facing a front of the screen, thereby causing the background object to be located on a side of the depth facing a back of the screen. Further avoid the background object located in the side of the front of the depth to improve display quality.

Another embodiment of the present invention is to provide a storage medium, particularly for an autostereoscopic three-dimensional (3D) image. That is, at least one computer readable storage medium having a computer readable computer program stored thereon, and when the computer program operating on the computer, thereby causing the computer to perform any one of the above methods.

Another embodiment of the present invention is to provide a terminal, particularly for an autostereoscopic three-dimensional (3D) image. The terminal comprises at least one processor and at least one memory. The memory stores computer program. The at least one memory and the computer program configured to, with the at least one processor, cause the terminal to perform any one of the above methods. That is, the processor executes any one of the above methods by calling the computer program stored in the memory.

It would be understood to those skilled in the art that all or part of the steps in various methods of the above embodiments may be implemented by computer program to instruct relevant hardware. The computer program may be stored in a computer readable storage medium, examples of the computer readable storage medium may include, but is not limited to, a Read Only Memory (ROM), a Random Access Memory (RAM), a magnetic disk, an optical disk, or the like. That is, various embodiments above can be implemented in a computer or device similar thereto readable medium by using software, hardware, or a combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. The above disclosed subject matter is to be considered illustrative, and not restrictive, and the appended claims are intended to cover all such modifications, enhancements, and other embodiments, which fall within the true spirit and scope of the present invention.

What is claimed is:

1. A display control method of an autostereoscopic three-dimensional (3D) image, comprising:
   capturing distance information of a background object relative to a screen in real time;
   capturing depth information of display content of the screen, the depth information having a position and length for defining the depth, wherein the display content comprises a left parallax image and a right parallax image, the left parallax image has a plurality of left parallax pixels, and the right parallax image has a plurality of right parallax pixels;
   determining a relative positional relation between the background object and the depth based on the distance information and the depth information;
   adjusting a display position of the left parallax image and/or the right parallax image on the screen;
   reducing a distance between the left parallax pixel and the right parallax pixel; and
   causing the depth to move toward a side of the front of the screen when the background object is located on a side of the depth facing a front of the screen, thereby causing the background object to be located on a side of the depth facing a back of the screen.

2. The display control method of the autostereoscopic three-dimensional (3D) image according to claim 1, wherein the plurality of left parallax pixels are arranged in a rectangular array of N columns, wherein the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other.

3. The display control method of the autostereoscopic three-dimensional (3D) image according to claim 1, wherein the step of reducing a distance between the left parallax pixel and the right parallax pixel, thereby causing the depth to move toward the side of the front of the screen, and further causing the background object to be located on the side of the depth facing the back of the screen further comprises:
   moving each column of the right parallax pixels to a right by a preset distance value in respect to each column of the left parallax pixels, thereby causing the depth to move toward the side of the front of the screen, and further causing the background object to be located on the side of the depth facing the back of the screen.

4. The display control method of the autostereoscopic three-dimensional (3D) image according to claim 1, wherein the step of reducing a distance between the left parallax pixel and the right parallax pixel, thereby causing the depth to move toward the side of the front of the screen, and further causing the background object to be located on the side of the depth facing the back of the screen further comprises:
   moving each column of the left parallax pixels to a left by a preset distance value in respect to each column of the right parallax pixels, thereby causing the depth to move toward the side of the front of the screen, and further causing the background object to be located on the side of the depth facing the back of the screen.

5. A display control method of an autostereoscopic three-dimensional (3D) image, comprising:
   capturing distance information of a background object relative to a screen;
   capturing depth information of display content of the screen, the depth information having a position and length for defining the depth, wherein the display content comprises a left parallax image and a right parallax image, the left parallax image has a plurality of left parallax pixels, and the right parallax image has a plurality of right parallax pixels;
   determining a relative positional relation between the background object and the depth based on the distance information and the depth information;
   adjusting a display position of the left parallax image and/or the right parallax image on the screen;
   reducing a distance between the left parallax pixel and the right parallax pixel; and
   causing the depth to move toward a side of the front of the screen when the background object is located on a side of the depth facing a front of the screen, thereby causing the background object to be located on a side of the depth facing a back of the screen.

6. The display control method of the autostereoscopic three-dimensional (3D) image according to claim 5, wherein the plurality of left parallax pixels are arranged in a rectangular array of N columns, wherein the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other.

7. The display control method of an autostereoscopic three-dimensional (3D) image according to claim 5, wherein the step of reducing a distance between the left parallax pixel and the right parallax pixel, thereby causing the depth to move toward the side of the front of the screen, and further causing the background object to be located on the side of the depth facing the back of the screen further comprises:
   moving each column of the right parallax pixels to a right by a preset distance value in respect to each column of the left parallax pixels, thereby causing the depth to move toward the side of the front of the screen, and further causing the background object to be located on the side of the depth facing the back of the screen.

8. The display control method of an autostereoscopic three-dimensional (3D) image according to claim 5, wherein the step of reducing a distance between the left parallax pixel and the right parallax pixel, thereby causing the depth to move toward the side of the front of the screen, and further causing the background object to be located on the side of the depth facing the back of the screen further comprises:
   moving each column of the left parallax pixels to a left by a preset distance value in respect to each column of the right parallax pixels, thereby causing the depth to move toward the side of the front of the screen, and further causing the background object to be located on the side of the depth facing the back of the screen.

9. A display control device of an autostereoscopic three-dimensional (3D) image, comprising:
   a first capture module for capturing distance information of a background object relative to a screen;
   a second capture module for capturing depth information of display content of the screen, the depth information having a position and length for defining the depth, wherein the display content comprises a left parallax image and a right parallax image, the left parallax image has a plurality of left parallax pixels, and the right parallax image has a plurality of right parallax pixels;

a determination module for determining a relative positional relation between the background object and the depth based on the distance information and the depth information; and an adjustment module for adjusting a display position of the left parallax image and/or the right parallax image on the screen and reducing a distance between the left parallax pixel and the right parallax pixel, thereby causing the depth to move toward a side of the front of the screen when the background object is located on a side of the depth facing a front of the screen, thereby causing the background object to be located on a side of the depth facing a back of the screen.

10. The display control device of the autostereoscopic three-dimensional (3D) image according to claim 9, wherein the plurality of left parallax pixels are arranged in a rectangular array of N columns, wherein the plurality of right parallax pixels are arranged in a rectangular array of N columns, the column number of the N columns of the left parallax pixels and the N columns of the right parallax pixels are respectively 1 to N from left to right, and the N columns of right parallax pixels and the N columns of left parallax pixels are alternately arranged with each other.

11. The display control device of the autostereoscopic three-dimensional (3D) image according to claim 10, wherein the adjustment module is further configured to:
move each column of the right parallax pixels to a right by a preset distance value in respect to each column of the left parallax pixels, thereby causing the depth to move toward the side of the front of the screen, and further causing the background object to be located on the side of the depth facing the back of the screen.

12. The display control device of the autostereoscopic three-dimensional (3D) image according to claim 10, wherein the adjustment module is further configured to:
move each column of the left parallax pixels to a left by a preset distance value in respect to each column of the right parallax pixels, thereby causing the depth to move toward the side of the front of the screen, and further causing the background object to be located on the side of the depth facing the back of the screen.

* * * * *